(12) United States Patent
Oliszewski

(10) Patent No.: US 8,643,886 B2
(45) Date of Patent: *Feb. 4, 2014

(54) SYSTEM AND METHODS FOR ENHANCED FACSIMILE COMMUNICATION NETWORK AND PREFERENCE SELECTION

(76) Inventor: Michael A. Oliszewski, Tigard, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/572,639

(22) Filed: Aug. 11, 2012

(65) Prior Publication Data

US 2012/0314255 A1 Dec. 13, 2012

Related U.S. Application Data

(63) Continuation of application No. 12/620,389, filed on Nov. 17, 2009, now Pat. No. 8,243,314, which is a continuation-in-part of application No. 11/431,017, filed on May 10, 2006, now Pat. No. 7,639,383.

(60) Provisional application No. 60/679,230, filed on May 10, 2005, provisional application No. 60/679,231, filed on May 10, 2005.

(51) Int. Cl.
*G06F 3/12* (2006.01)
*G06K 15/00* (2006.01)

(52) U.S. Cl.
USPC .......... 358/1.15; 358/1.13; 358/400; 358/1.16

(58) Field of Classification Search
CPC .......... H04N 1/33323; H04N 1/33346; H04N 1/33369; H04N 2201/002; H04N 2201/33364
See application file for complete search history.

(56) References Cited

U.S. PATENT DOCUMENTS

| 5,638,497 | A * | 6/1997 | Kimber et al. | 358/1.15 |
| 5,903,716 | A * | 5/1999 | Kimber et al. | 358/1.13 |
| 6,560,318 | B1 * | 5/2003 | Spielman et al. | 379/88.12 |
| 7,324,223 | B1 * | 1/2008 | Mori | 358/1.15 |
| 2002/0093674 | A1 * | 7/2002 | Ferlitsch et al. | 358/1.15 |
| 2003/0065776 | A1 * | 4/2003 | Malik et al. | 709/225 |
| 2003/0160998 | A1 * | 8/2003 | Kuwahara | 358/1.15 |

* cited by examiner

*Primary Examiner* — Dov Popovici
(74) *Attorney, Agent, or Firm* — J. Curtis Edmondson

(57) ABSTRACT

Disclosed is a database management device that has a transmitting facsimile device and a receiving facsimile device to select between a default communications network and an alternate communications network based on advertised communication network capability and by a selection logic, this selection logic determined by color, resolution, baud rate, compression format; the communications network can be the public switched telephone network, the internet, or other networks.

9 Claims, 4 Drawing Sheets

SYSTEM AND METHODS FOR ENHANCED FACSIMILE COMMUNICATION NETWORK AND PREFERENCE SELECTION

CROSS REFERENCES TO RELATED APPLICATIONS

This application is a continuation of U.S. application Ser. No. 12/620,389, filed Nov. 17, 2009, to be issued as U.S. Pat. No. 8,243,314 on Aug. 14, 2012, which is a continuation in part of U.S. application Ser. No. 11/431,017, filed May 10, 2006, now U.S. Pat. No. 7,639,383 titled "Systems and Methods for Enhanced Electronic Facsimile Communication Network and Preference Selection," which claims the benefit under 35 U.S.C. sctn. 119, of U.S. Provisional Patent Application Ser. No. 60/679,230 filed May 10, 2005, the contents of which are incorporated herein by reference and U.S. Provisional Patent Application Ser. No. 60/679,231 filed May 10, 2005, the contents of which are incorporated herein by reference.

FIELD OF THE INVENTION

This invention relates to electronic facsimile communication. More specifically, the invention relates to the selection of user preferred modes of facsimile communication.

BACKGROUND OF THE INVENTION

Electronic facsimile (commonly known as FAX) transmission has become a popular and convenient method for sending documents to remote users over communication networks. As communication technology has evolved, electronic facsimile devices (and the protocols associated with these devices) have become more sophisticated in their optional features and have likewise evolved to become compatible with newer communication networks. While the capabilities and communication network compatibilities of electronic facsimile devices have expanded, the management of selecting which communication network to use in transmitting a facsimile document generally remains relatively primitive. For example, communication network selection generally occurs by manual selection of a communication network based on the addressing identifier (such as a phone number) of the receiving facsimile device. By relying exclusively on the addressing identifier of the receiving facsimile device, the communication network selection is limited to a single, default selection and other, potentially preferred, communication network options are ignored. Facsimile transmission methods that ignore potentially preferred communication networks or other preferred features do not take advantage of available efficiencies and, as a result, document transmission by facsimile is not optimized. Thus, there is room for improvement in the efficiency of facsimile document transmission by avoiding "default" features and communication network selections in favor of chosen features and preferred communication network selections

SUMMARY OF THE INVENTION

The present invention increases the efficiency of facsimile document transmission by addressing the above-identified problems. Specifically, the systems and methods of the present invention allow for the discovery and selection of a preferred communication network (from a plurality of available communication networks) that is compatible with the capabilities of both the transmitting facsimile device and the receiving facsimile device. In allowing the discovery and selection of a mutually-compatible and preferred communication network, the systems and methods of the present invention allow for document transmission over a communication network with preferred characteristics such as, for example and without limitation, a preferred network provider, lower use cost, greater speed, higher security, or better availability. Likewise, the present invention can be used to allow the discovery of a user's other preferred features relating to, without limitation, color, resolution, baud rate, compression format, and combinations thereof. Thus, allowing the selection of a preferred communication network or other features according to particular characteristics, rather than using default communication networks, or features can enhance the efficiency of facsimile document transmission.

To accomplish the aforementioned objectives the systems and methods of the present invention in one embodiment include (i) a receiving facsimile device adapted to advertise alternate communication network capabilities and associated addressing identifiers by which the receiving facsimile device can be contacted across the alternate communication networks; and (ii) a transmitting facsimile device adapted to discover the receiving facsimile device's alternate communication network capabilities and associated addressing identifiers, wherein a communication network is selected that is mutually compatible with and available to the transmitting facsimile device and the receiving facsimile device, based on the network capabilities and associated addressing identifiers.

Specifically, one embodiment according to the present invention comprises allowing a transmitting facsimile device and a receiving facsimile device to select a preferable communications network by enabling the receiving facsimile device to advertise both communication network capability data associated with the receiving facsimile device and addressing identifiers associated with the communication network capability data and the receiving facsimile device; enabling the transmitting facsimile device to read the advertised communication network capability data and the advertised addressing identifiers associated with the communication network capability data and the receiving facsimile device; and enabling a selection logic to preferentially select a communication network chosen from the advertised communication network capability data that is also compatible with the transmitting facsimile device's capabilities.

The method can also further include enabling the receiving facsimile device to advertise other capabilities associated with the receiving facsimile device and enabling the transmitting facsimile device to read the advertised other capabilities and enabling a selection logic to preferentially select transmission parameters that are compatible with the receiving facsimile device and the transmitting facsimile device. These other capabilities can be selected from, without limitation, one or more of color, resolution, baud rate, compression format, and combinations thereof.

The enabling of the advertising by the receiving facsimile device and the enabling of the reading by the transmitting facsimile device can occur through, without limitation, the use of an extensible data type imbedded within a known protocol. Non-limiting appropriate examples include when the extensible data type is a Nonstandard Data Frame (NSDF) and the known protocol is ITU T.38.

Selection logic used in accordance with the present invention can be based, at least in part, on predetermined preferences of known communication parameters selected from the group consisting of transmission speed, transmission cost, availability, security parameters, and combinations thereof.

Alternatively, selection logic can be based on user inputted preferences regarding known communication parameters selected from the group consisting of transmission speed, transmission cost, availability, security parameters, color, resolution, baud rate, compression format, and combinations thereof.

Methods according to the present invention can also include providing a database for storing previously advertised communication network capabilities and addressing identifiers, other advertised capabilities and user inputted preferences associated with a particular receiving facsimile device; enabling the transmitting facsimile device and the database to communicate; and enabling the selection logic to preferentially select a communication network and other transmittal parameters based on information stored in the database. Databases used in accordance with the present invention can be updated with one or more of: new communication network capability data and addressing identifiers advertised by a receiving facsimile device; new other capability data advertised by a receiving facsimile device; and new user inputted preferences associated with a receiving facsimile device.

The present invention also includes systems. In one system according to the present invention, the system comprises a receiving facsimile device, and a transmitting facsimile device, wherein the receiving facsimile device can advertise both communication network capability data and addressing identifiers associated with the receiving facsimile device, and wherein the transmitting device can read the advertised communication network capability data and the advertised addressing identifiers associated with the communication network capability data and the receiving facsimile device; and wherein based on a selection logic, a preferable communication network is chosen from the advertised communication network capability data that is also compatible with the capabilities of the transmitting facsimile device.

In another system the receiving facsimile device can also advertise other capabilities associated with the receiving facsimile device and the transmitting facsimile device can also read the advertised other capabilities and the selection logic can preferentially select transmission parameters that are compatible with the receiving facsimile device and the transmitting facsimile device. These other capabilities can be selected from, without limitation, the group consisting of color, resolution, baud rate, compression format and combinations thereof.

Systems according to the present invention can further comprise an extensible data type imbedded within a known protocol such that the enabling of the advertising by the receiving facsimile device and the enabling of the reading by the transmitting facsimile device occurs. The extensible data type can be, without limitation, a Nonstandard Data Frame (NSDF) and the known protocol can be, without limitation, ITU T.38.

Selection logic used in accordance with the systems of the present invention can be based at least in part on predetermined preferences of known communication parameters selected from the group consisting of transmission speed, transmission cost, availability and security parameters. Alternatively, the selection logic can be based on user inputted preferences regarding known communication parameters selected from, without limitation, the group consisting of transmission speed, transmission cost, availability, security parameters, color, resolution, baud rate, compression format, and combinations thereof.

Systems according to the present invention can further comprise a database for storing previously advertised communication network capabilities and addressing identifiers of the receiving facsimile device; a communication link for the transmitting facsimile device and the database to communicate; and selection logic adapted to preferentially select a communication network based on communication network capability data and addressing identifiers stored in the database. Databases used in accordance with systems of the present invention can be updatable with new communication network capability data and addressing identifiers advertised by a receiving facsimile device, new other capability data advertised by a receiving facsimile device, and new user inputted preferences associated with a receiving facsimile device.

DEFINITION OF TERMS

As used herein, "communication(s) network" includes any network, public or private, capable of transmitting data from one point to another, including without limitation: a Public Switched Telephone Network, a computer data network, and an internet-based network.

As used herein, "facsimile device" includes any device capable of transmitting a facsimile transmission over a communication(s) network, including without limitation: a FAX machine, a computer, a email client application, and a handheld PDA or Smart phone.

DETAILED DESCRIPTION OF THE INVENTION

Figure 1:
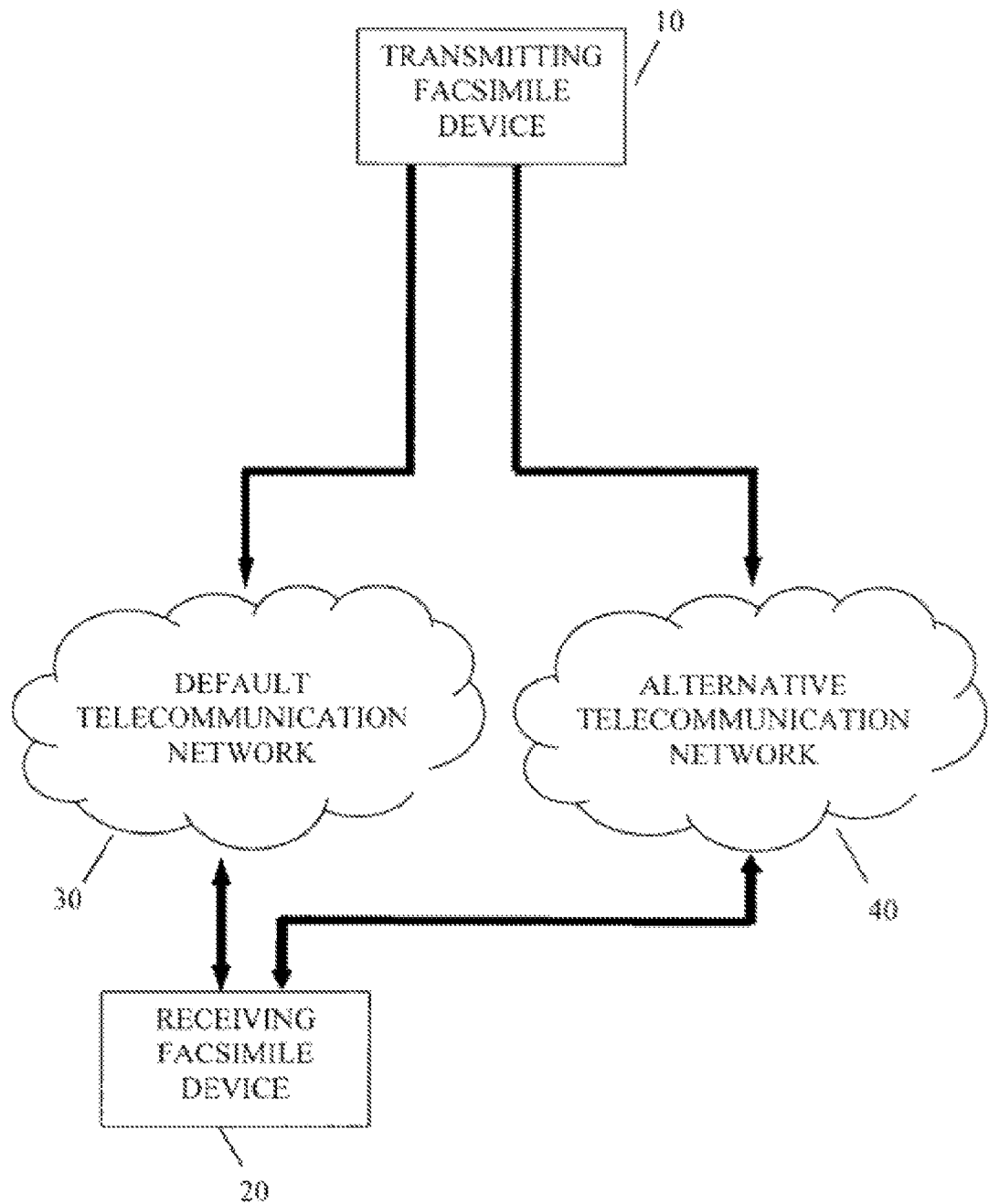
FIG. 1 depicts one embodiment of a system of the present invention in which the methods of the present invention can operate.

Condense Referring to the Figures, FIG. 1 depicts one embodiment of the systems of the present invention. This embodiment includes (i) a transmitting facsimile device 10 capable of communicating with similar devices (such as receiving facsimile devices) and (ii) a receiving facsimile device 20 capable of communicating with similar devices (such as the transmitting facsimile device 10). This embodiment further includes a system for receiving facsimile devices to advertise alternative communication network compatibility and availability information and associated addressing identifiers. These features can be accomplished in the present embodiment by use of extensible data-type handling provided for in electronic facsimile protocols (such as, for example and without limitation, NonStandard Data Frames, also known as NSDF, present in the ITU T.30 or ITU T.38 electronic facsimile protocols). Such protocols are known to those of ordinary skill in the art. The embodiment of the present invention depicted in FIG. 1 also includes a default telecommunication network 30 (such as a PSTN telephone network) which allows the transmitting facsimile device 10 to communicate with the facsimile receiving device 20 and one or more mutually-available and compatible alternative communication networks 40 (such as an internet-based network). This mutually-available and compatible alternative communication network 40 allows for a second way of communication and may have different features associated with its use (such as, for example and without limitation, greater speed, lower cost, better availability and/or enhanced security).

Figure 2:
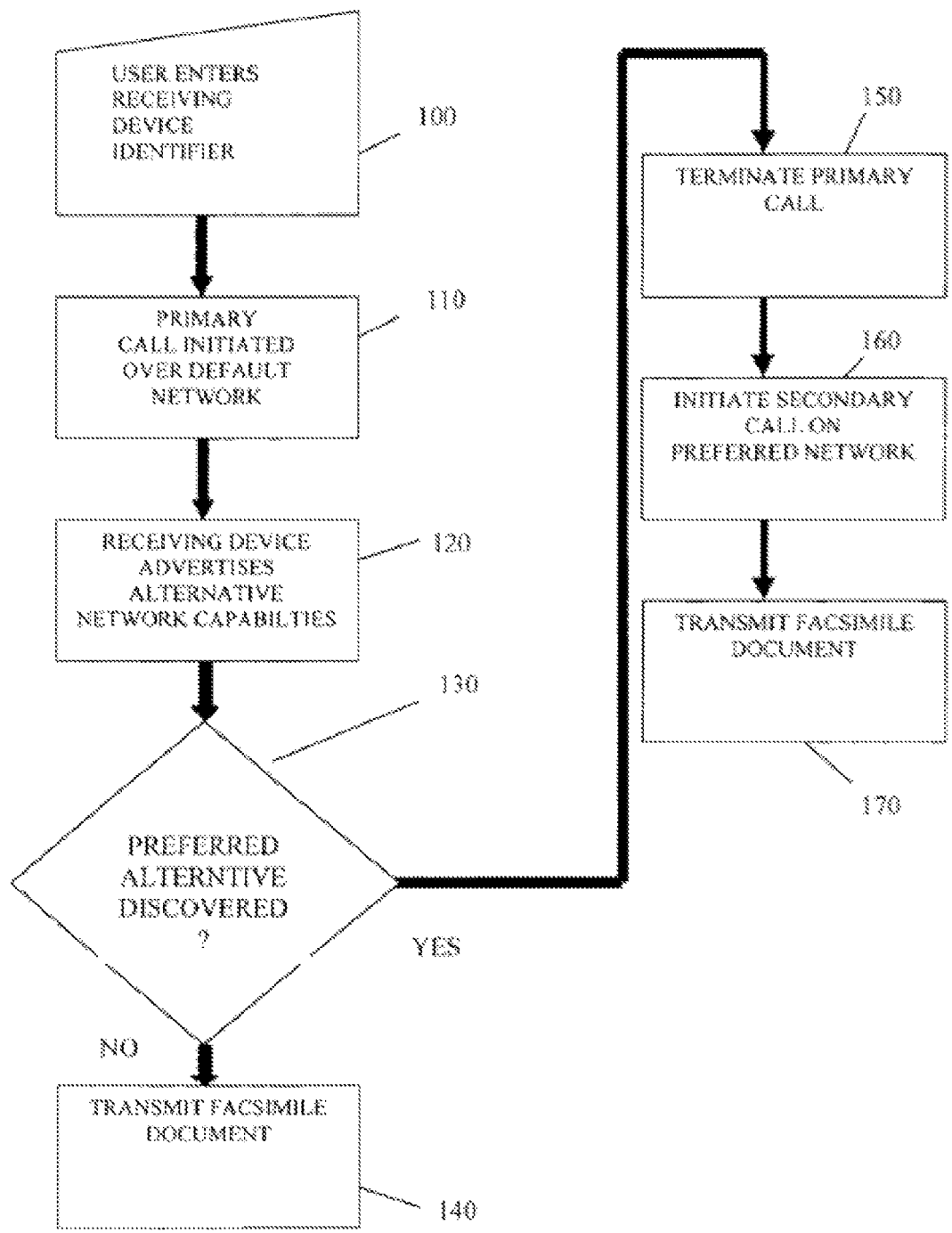
FIG. 2 depicts an overall flow chart representing one embodiment of the methods of the present invention used to select a preferred communication network.

FIG. 2 (which should be referred to in conjunction with FIG. 1) depicts one embodiment of the steps of operation of the methods of the present invention. In step 100 a unique addressing identifier (such as a PSTN telephone number) associated with the receiving facsimile device 20 is entered into a transmitting facsimile device 10. In step 110 a primary facsimile connection call is initiated over a default communication network (such as a PSTN telecommunication network) 30. Communication between the transmitting facsimile device 10 and the receiving facsimile device 20 is initiated by the transmitting facsimile device 10 using a known addressing identifier (such as a PSTN telephone number). In step 120 a receiving facsimile device 20 advertises its associated alternative communication network compatibilities (such as, for example and without limitation, Voice-Over IP network capabilities as per the ITU T.38 protocol) to transmitting facsimile device 10. In step 130 selection logic is applied to determine whether the alternative communication network 40 capabilities of the receiving facsimile device 20 are compatible with the native capabilities of the transmitting facsimile device 10 and whether the alternative communication network 40 is preferable based on defined criteria such as, for example and without limitation, communication speed, enhanced security, availability and cost afforded by features within the architecture of the particular communication networks 30, 40. If the selection logic determines that there is not a preferable alternative communication network 40, the process flow is routed to step 140 wherein the facsimile document is transmitted to the receiving facsimile device 20 using the default telecommunication network 30. If the selection logic determines that there is a preferable alternative preferable communication network 40, the process flow is routed to step 150. In step 150, the primary facsimile call established in step 120 is terminated and a secondary facsimile call is initiated over the alternative telecommunication network 40 determined in step 130. In step 160 the facsimile document is transmitted over the alternative preferable communication network 40.

Figure 3:
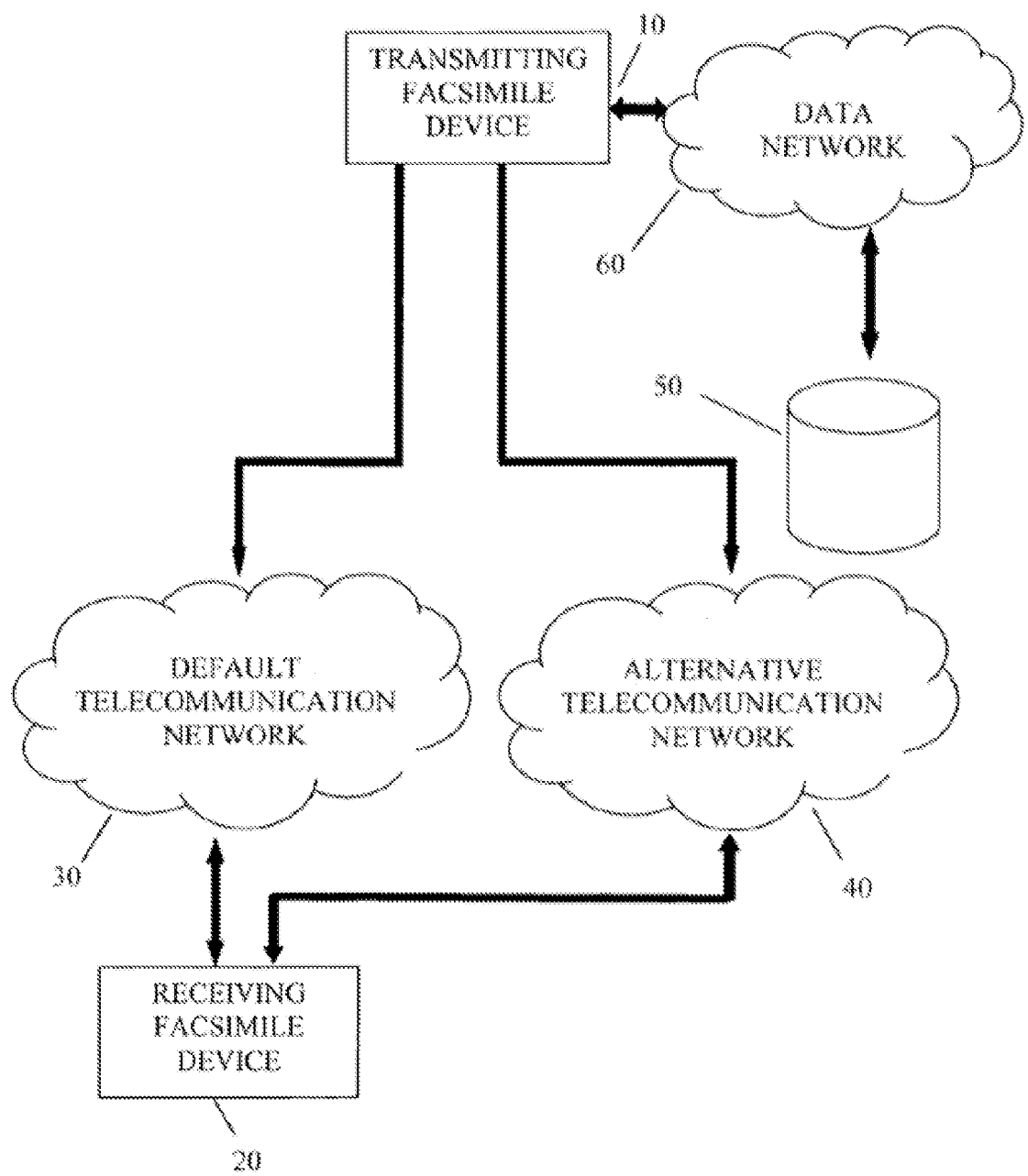
FIG. 3 depicts one embodiment of the systems of the present invention. This embodiment is similar to the system depicted in FIG. 1 with the addition of a database.

FIG. 3 depicts another embodiment of the present invention. This embodiment is similar to that depicted FIG. 1 with the additional features of (i) a database 50 to be updated with discovered alternative communication network 40 information associated with receiving facsimile device(s) 20; and (ii) mutual data communication 60 (such as, for example and without limitation, a LAN or WAN) between the facsimile transmitting device 10 and the database 50. This communication is described below and in co-pending application "Systems And Methods For Determining User Preferences and/or Facsimile Device Capabilities Before Call Initiation" filed on May 10, 2006 (inventors Oliszewski, Nauimi & Moore) which is incorporated by reference herein in its entirety for all purposes.

Databases used in accordance with the present invention can prevent facsimile calls from being initiated before optimal or preferred network and transmission parameters are defined for a particular transmission. For example, databases used in accordance with the present invention can store preferences regarding how a particular user prefers to receive messages. This type of preference can relate to, without limitation, the network the user prefers to receive transmissions over, the location transmissions are sent and/or preferences regarding physical characteristics of the transmission such as whether the user prefers to receive facsimile transmissions in color or in black and white. Thus, while one aspect of the present invention involves network selection (type and/or carriers) other parameters can likewise be advertised by the receiving facsimile device and/or stored for later use in the presently described databases.

Figure 4:
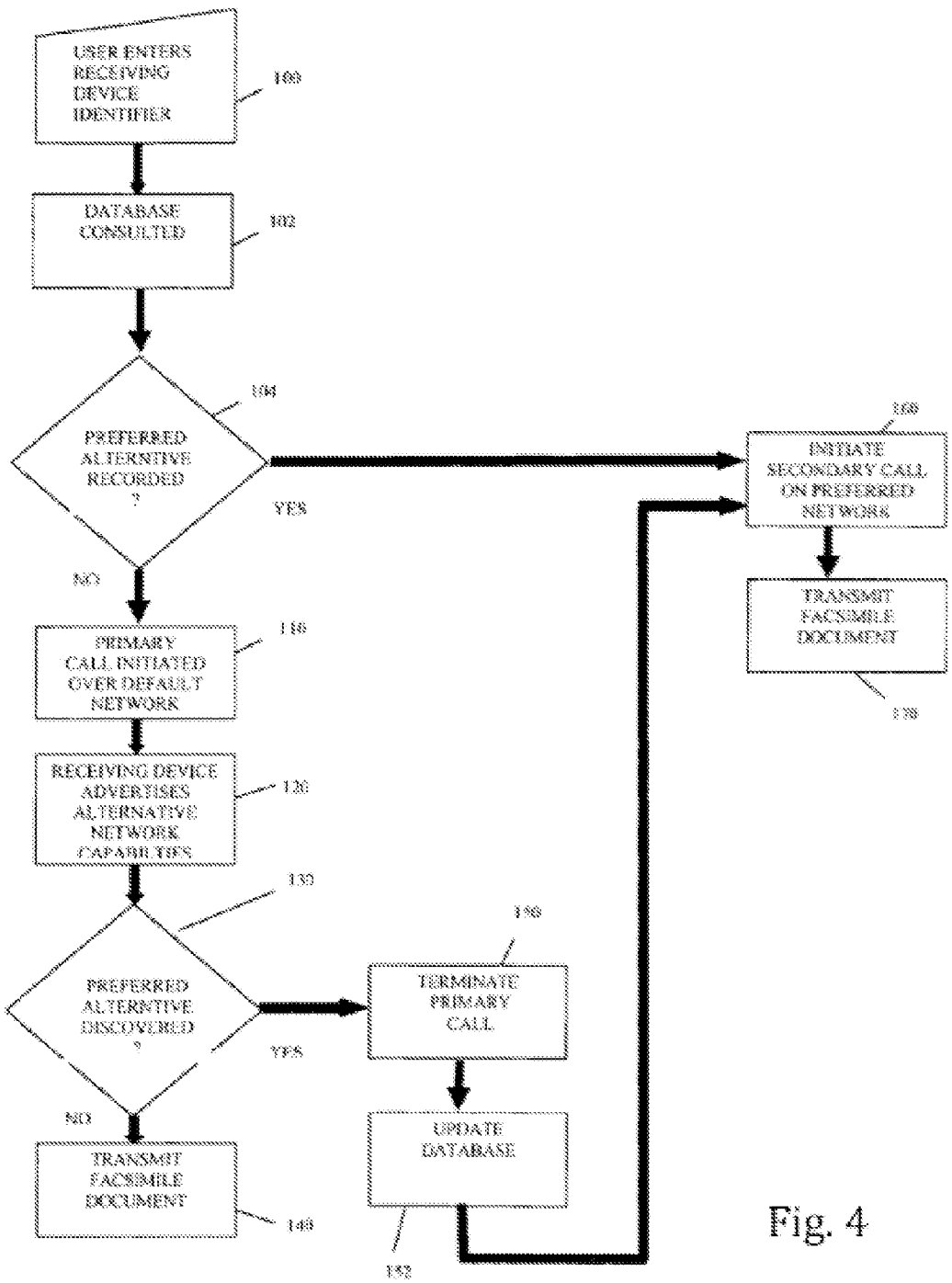
FIG. 4 depicts an overall flow chart representing one embodiment of the methods of the present invention used to select a preferred communication network. This embodiment includes the additional functionality of storing and retrieving alternative communication network compatibility and availability information associated with the receiving facsimile device.

Referring to FIG. 3 in conjunction with FIG. 4, FIG. 4 depicts an operational flowchart similar to that depicted FIG. 2. The flowchart depicted in FIG. 4 includes the additional ability to retrieve information from and store information to the database 50. In step 102 the database 50 is consulted through a communication network 60 (such as, for example and without limitation, LAN or WAN) for the presence of alternative communication network 40 capabilities or other information associated with the receiving facsimile device 20. In step 104 selection logic is applied to determine whether the alternative communication network 40 capabilities of the receiving facsimile device 20 are compatible with the native capabilities of the transmitting facsimile device 10 and whether the alternative communication network 40 is preferable to the default network based on defined criteria such as, for example and without limitation, communication speed, cost of use, enhanced security or availability afforded by known features within the architecture of the communication networks 30, 40 or other preferences stored in the database as associated with the relevant receiving facsimile device. If the selection logic determines that there is not a preferable alternative communication network 40, the process flow is routed to step 110 wherein the primary facsimile call is initiated across the default telecommunication network 30 and the process continues therefrom in a manner consistent with the process described in FIG. 2. If a preferable alternative communication network 40 is discovered, in step 130 (as described in FIG. 2), the process flow is routed to step 150 (wherein the primary facsimile call is terminated as described in FIG. 2) and subsequently to step 152 wherein the database 50 is updated through the communication network 60 with the newly discovered alternative communication network 40 capability. Regardless of the network a transmission is sent over, the facsimile document and/or the transmission itself can be modified by preferences discovered within the database so long as such modifications are possible on the chosen network. Because step 104 routes process flow directly to step 160 (thereby circumventing step 152) it can be inferred that in the presently described embodiment the discovered alternative telecommunication network 40 capability was not in the database 50. While step 152 is said to occur directly after step 150, the database 50 could be updated at any time after step 150 including (but not limited to) after the facsimile document transmittal in step 170. In embodiments using or incorporating databases, as will be understood by one of ordinary skill in the art, these embodiments utilize (i) a receiving facsimile device adapted to advertise alternate communication network capabilities and associated addressing identifiers by which the receiving facsimile device can be contacted across the alternate communication networks; and (ii) a transmitting facsimile device adapted to discover the receiving facsimile device's alternate communication network capabilities and associated addressing identifiers; (iii) a database management device for processing stored data; (iv) a database capable of storing facsimile capability data and/or receiving-user preferences of receiving facsimile devices identified by a unique addressing identifier (such as, for example and without limitation, a PSTN phone number) associated with the receiving device; (v) a mutual data communication method between the transmitting facsimile device and the database management device (such as, for example and without limitation, a LAN or WAN); and (vi) a data communication network that is available for the transmitting facsimile device and the receiving facsimile device to mutually communicate.

The process flow of consulting the database 50 for preexisting alternative communication network 40 capability or other preference information allows for the selection of a preferred alternative communication network 40 without initiating a primary facsimile call (as explained in Step 110) over a (non-preferred) default telecommunication network 30. This feature of the present invention further serves to enhance the efficiency of facsimile document transmission.

Based on this detailed description, it should be clear that the present invention includes, in one embodiment, a method comprising allowing a transmitting facsimile device and a receiving facsimile device to select a preferable communications network by enabling the receiving facsimile device to advertise both communication network capability data associated with the receiving facsimile device and addressing identifiers associated with the communication network capability data and the receiving facsimile device; enabling the transmitting facsimile device to read the advertised communication network capability data and the advertised addressing identifiers associated with the communication network capability data and the receiving facsimile device; and enabling a selection logic to preferentially select a communication network chosen from the advertised communication network capability data that is also compatible with the transmitting facsimile device's capabilities.

The method can also further include enabling the receiving facsimile device to advertise other capabilities associated with the receiving facsimile device and enabling the transmitting facsimile device to read the advertised other capabilities and enabling a selection logic to preferentially select transmission parameters that are compatible with the receiving facsimile device and the transmitting facsimile device. These other capabilities can be selected from, without limitation, one or more of color, resolution, baud rate, compression format, and combinations thereof.

The enabling of the advertising by the receiving facsimile device and the enabling of the reading by the transmitting facsimile device can occur through, without limitation, the use of an extensible data type imbedded within a known protocol. Non-limiting appropriate examples include when the extensible data type is a Nonstandard Data Frame (NSDF) and the known protocol is ITU T.38.

Selection logic used in accordance with the present invention can be based, at least in part, on predetermined preferences of known communication parameters selected from the group consisting of transmission speed, transmission cost, availability, security parameters, and combinations thereof. Alternatively, selection logic can be based on user inputted preferences regarding known communication parameters selected from the group consisting of transmission speed, transmission cost, availability, security parameters, color, resolution, baud rate, compression format, and combinations thereof.

Methods according to the present invention can also include providing a database for storing previously advertised communication network capabilities and addressing identifiers, other advertised capabilities and user inputted preferences associated with a particular receiving facsimile device; enabling the transmitting facsimile device and the database to communicate; and enabling the selection logic to preferentially select a communication network and other transmittal parameters based on information stored in the database. Databases used in accordance with the present invention can be updated with one or more of new communication network capability data and addressing identifiers advertised by a receiving facsimile device, new other capability data advertised by a receiving facsimile device, and new user inputted preferences associated with a receiving facsimile device.

The present invention also includes systems. In one system according to the present invention, the system comprises a receiving facsimile device, and a transmitting facsimile device, wherein the receiving facsimile device can advertise both communication network capability data and addressing identifiers associated with the receiving facsimile device, and wherein the transmitting device can read the advertised communication network capability data and the advertised addressing identifiers associated with the communication network capability data and the receiving facsimile device; and wherein based on a selection logic, a preferable communication network is chosen from the advertised communication network capability data that is also compatible with the capabilities of the transmitting facsimile device.

In another system the receiving facsimile device can also advertise other capabilities associated with the receiving facsimile device and the transmitting facsimile device can also read the advertised other capabilities and the selection logic can preferentially select transmission parameters that are compatible with the receiving facsimile device and the transmitting facsimile device. These other capabilities can be selected from, without limitation, the group consisting of color, resolution, baud rate, compression format and combinations thereof.

Systems according to the present invention can further comprise an extensible data type imbedded within a known protocol such that the enabling of the advertising by the receiving facsimile device and the enabling of the reading by the transmitting facsimile device occurs. The extensible data type can be, without limitation, a Nonstandard Data Frame (NSDF) and the known protocol can be, without limitation, ITU T.38.

Selection logic used in accordance with the systems of the present invention can be based at least in part on predetermined preferences of known communication parameters selected from the group consisting of transmission speed, transmission cost, availability and security parameters. Alternatively, the selection logic can be based on user inputted preferences regarding known communication parameters selected from, without limitation, the group consisting of transmission speed, transmission cost, availability, security parameters, color, resolution, baud rate, compression format, and combinations thereof.

Systems according to the present invention can further comprise a database for storing previously advertised communication network capabilities and addressing identifiers of the receiving facsimile device; a communication link for the transmitting facsimile device and the database to communicate; and selection logic adapted to preferentially select a communication network based on communication network capability data and addressing identifiers stored in the database. Databases used in accordance with systems of the present invention can be updatable with new communication network capability data and addressing identifiers advertised by a receiving facsimile device, new other capability data advertised by a receiving facsimile device, and new user inputted preferences associated with a receiving facsimile device.

It is to be understood that the present invention is not limited to the particular embodiments, materials, and examples described herein, as these can vary. It also is to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "a database" or "an alternative communication network" is a reference to one or more databases or alternative communication networks and includes equivalents thereof known to those skilled in the art and so forth.

Unless defined otherwise, all technical terms used herein have the same meanings as commonly understood by one of ordinary skill in the art to which this invention belongs. Specific methods, devices, and materials are described, although any methods and materials similar or equivalent to those described herein can be used in the practice or testing of the present invention.

I claim:

1. A database management device comprising:
    a database, the database operable to receive and store a receiving facsimile advertised communication network capability and a transmitting facsimile advertised communication network capability;
    a data network, the data network is connected to the database;
    a transmitting facsimile device; the transmitting facsimile device operable to store and transmit the receiving facsimile advertised communication network capability through the data network and operable to store and transmit the transmitting facsimile advertised communication network capability through the data network;
    a default communication network, the default communication network connecting the transmitting facsimile device with a receiving facsimile device; and an alternate communication network, the alternate communication network connecting the transmitting facsimile device with the receiving facsimile device;
    so that the receiving facsimile device and the transmitting facsimile device mutually communicate using either the default communication network or the alternate communication network as determined by a selection logic;
    where the selection logic is enabled by the database.

2. The database management device according to claim 1 where the default communication network is a public switched telephone network.

3. The database management device according to claim 1 where the alternate communication network is an internet.

4. The database management device according to claim 1 where the alternate communication network uses an ITU T.38 communications protocol.

5. The database management device according to claim 1 where the alternate communication network uses an ITU T.30 communications protocol.

6. The database management device according to claim 1 where the alternate communication network uses a non standard data frame.

7. The database management device according to claim 1 where the database is capable of storing a facsimile capability data and/or receiving user preferences of the receiving facsimile device.

8. The database management device according to claim 1 where a user preference updates the transmitting facsimile advertised communication network capability.

9. The database management device according to claim 1 where the selection logic having a set of parameters, the parameters selected from a group consisting of transmission speed, transmission cost, security parameters, color, resolution, baud rate, and compression format.

* * * * *